Feb. 9, 1971  A. G. SEIPOS  3,561,030
CONVEYANCE LOADER
Filed July 28, 1969  3 Sheets-Sheet 1
FIG. 1
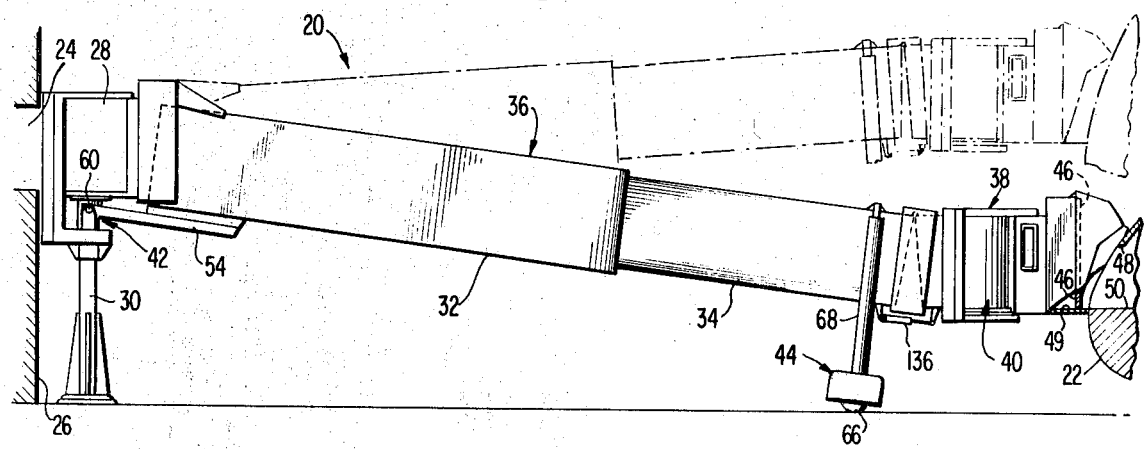
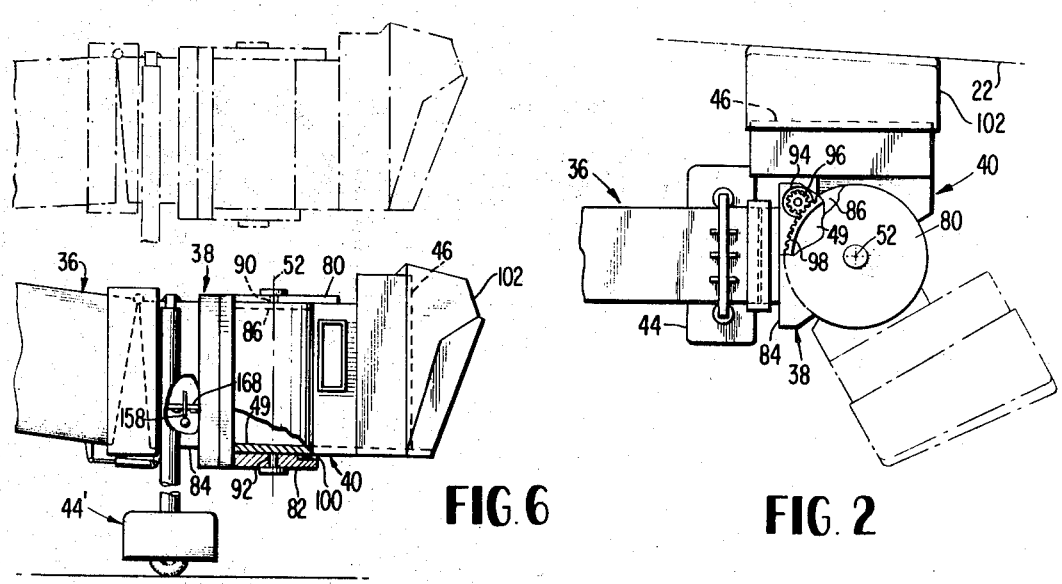
FIG. 6  FIG. 2
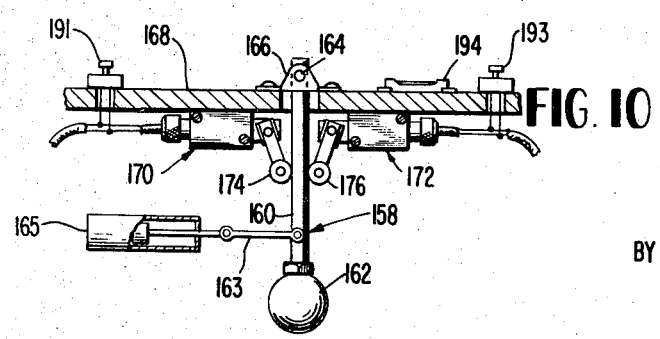
FIG. 10
INVENTOR
ANDREW G. SEIPOS
BY Shanley & O'Neil
ATTORNEYS Feb. 9, 1971     A. G. SEIPOS     3,561,030
CONVEYANCE LOADER
Filed July 28, 1969     3 Sheets-Sheet 2

INVENTOR
ANDREW G. SEIPOS
BY *Shanley & O'Neil*
ATTORNEYS

Feb. 9, 1971 A. G. SEIPOS 3,561,030
CONVEYANCE LOADER
Filed July 28, 1969 3 Sheets-Sheet 3
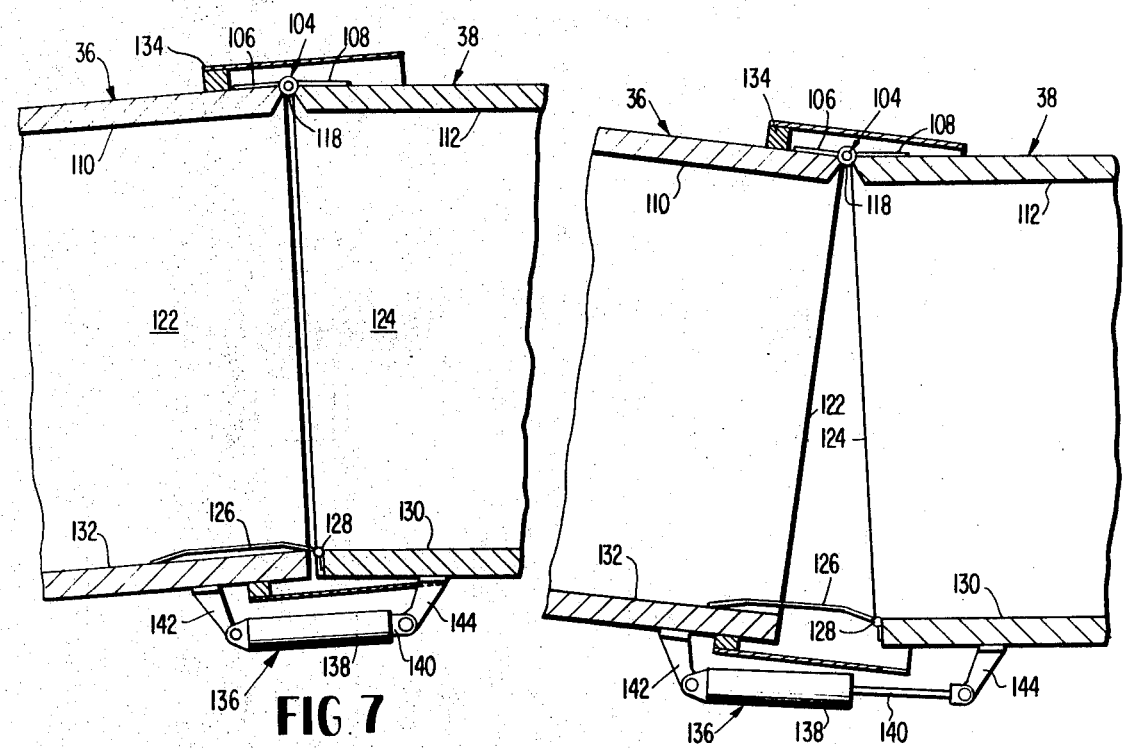
FIG. 7
FIG. 8
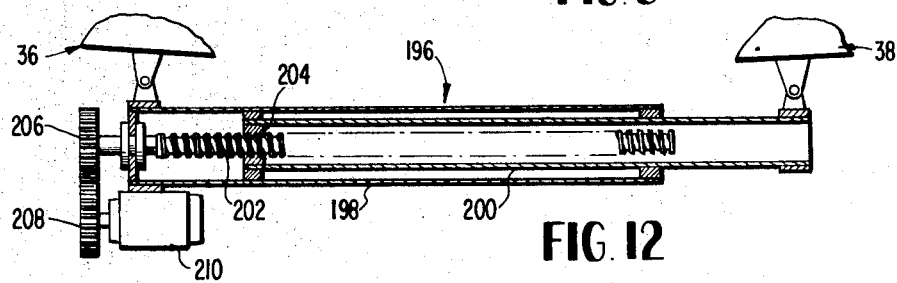
FIG. 12
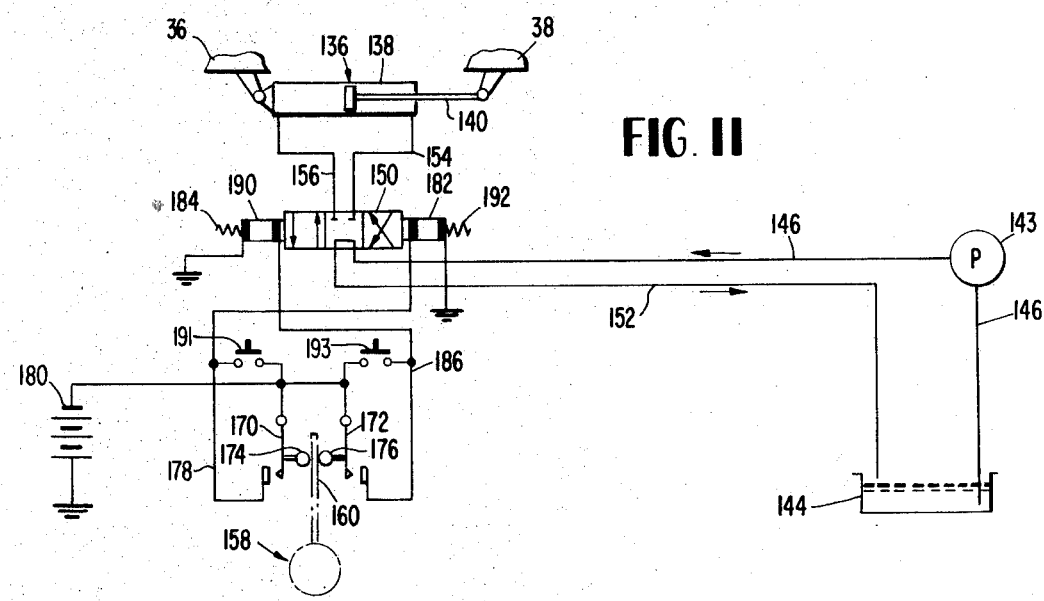
FIG. 11

United States Patent Office 3,561,030
Patented Feb. 9, 1971

3,561,030
CONVEYANCE LOADER
Andrew G. Seipos, Miami, Fla., assignor to Wollard Aircraft Equipment, Inc., a corporation of Washington
Filed July 28, 1969, Ser. No. 845,387
Int. Cl. B65g 11/00
U.S. Cl. 14—71                                              20 Claims

ABSTRACT OF THE DISCLOSURE

Conveyance loader includes an elongated, articulated tunnel which is vertically swingable to accommodate conveyances having doorways at different elevations. The outer tunnel section is independently pivotally adjustable to a horizontal position irrespective of inclination of the main tunnel section, to avoid tripping hazards for passengers stepping between the conveyance and the loader. Automatic leveling of the outer tunnel section is effected by a pendulum, which indicates the horizontality of the outer tunnel section, and a power system which is responsive to the position of the pendulum to swing the outer tunnel section to horizontal disposition. Manual control can be effected by manipulation of electrical switches.

BACKGROUND OF THE INVENTION

Passenger aircraft doorways are of varying heights above ground level. However, the terminal building doorway through which passengers enplane and deplane is at a fixed elevation, and it is common for aircraft passenger loaders to be vertically swingable to communicate the terminal doorway with the aircraft doorway irrespective of the height of the aircraft doorway. Often the aircraft doorway is at an elevation different from that of the terminal doorway, and the loader must be inclined in order to communicate the aircraft with the terminal. In certain orientations of the aircraft relative to the loader, a tripping hazard is present at the location where the passengers step between the level aircraft floor and the inclined loader floor, and a main object of the invention is the provision of conveyance loaders in which this tripping hazard is eliminated.

Other objects and advantages of the invention will appear from the following detailed description which, with the accompanying drawings, discloses a preferred embodiment of the invention for purposes of illustration only. For definition of the scope of the invention, reference will be made to the appended claims.

BRIEF DESCRIPTION OF THE DRAWINGS

FIG. 1 is a side view showing the general arrangement of a conveyance loader embodying principles of the the invention.

FIG. 2 is a top view showing details of the conveyance vestibule end of the loader of FIG. 1.

FIG. 6 depicts further details of the conveyance vestibule end of the loader of FIG. 1, and shows an alternative arrangement for the loader-swinging structure.

FIG. 7 is an enlarged view of details of the structure at the joint between inner and outer tunnel sections in one position of operation of the loader of FIG. 1.

FIG. 8 depicts the details of FIG. 7 in another position of operation.

FIG. 10 illustrates details of the control system of the loader of FIG. 1.

FIG. 11 diagrammatically illustrates the control system of the loader of FIG. 1.

FIG. 12 is a detail view of an alternative form of power unit for the loader of FIG. 1.

Figure 4:
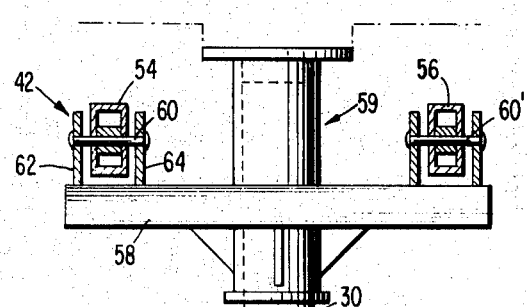
FIG. 4 is a front view of details of the pivotal tunnel-mounting structure of the loader of FIG. 1.

Primed reference characters, where employed, denote elements corresponding to elements indicated with the unprimed characters.

DETAILED DESCRIPTION OF THE PREFERRED EMBODIMENT

In FIG. 1, a conveyance loader 20 is shown in position for passengers to enplane and deplane an aircraft 22 through a doorway 24 in a terminal building 26. Loader 20 includes a terminal vestibule 28 mounted on a pedestal or base structure 30. Two telescoping tunnel segments 32, 34 extend from terminal vestibule 28 and form a main tunnel or passageway section 36. An outer tunnel section 38 is axially joined to tunnel section 36 to define therewith a continuous passageway between aircraft and terminal. Tunnel section 38 includes a conveyance vestibule 40 which is contiguous to aircraft 22 when the loader is in aircraft-servicing position.

The inner end portion of main tunnel section 36 is mounted on pedestal 30 for vertically swinging movement by pivot structure 42. Tunnel section 36 is also horizontally swingable on pedestal 30, as is conventional. The outer end portion of tunnel section 36 is supported by a wheeled undercarriage 44 which is extensible and retractable in a generally vertically direction to swing tunnel sections 36, 38 about pivot structure 42 and thereby position conveyance vestibule 40 at a height to register with the doorway of aircraft 22. As indicated respectively by the solid-line and dotted-line positions of loader 20, the loader can be inclined downwardly or upwardly relative to the horizontal when necessary because of disparities in height between the terminal and aircraft doorways. When the loader is properly positioned, doorway 46 of vestibule 40 is registered with doorway 48 of aircraft 22, and the end edge of vestibule floor 49 is coplanar with aircraft floor 50. As can be seen from FIG. 2, conveyance vestibule 40 is rotatable about a vertical axis 52, so as to have capability for serving aircraft parked at various angles relative to the loader. In FIG. 2, vestibule 40 is shown in solid lines as it appears when rotated 90° from its position of FIG. 1.

Figure 3:
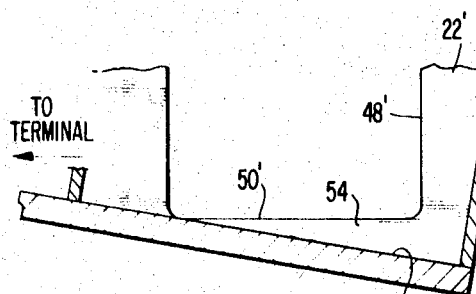
FIG. 3 illustrates a tripping hazard which is present in prior art loaders.

In prior art loaders, when the aircraft is parked in a relation to the loader such as shown in FIG. 1, where the vestibule doorway faces in the direction of inclination of the loader, no tripping hazard for the passengers is present because the end edge of the loader floor is parallel to the edge of the aircraft floor irrespective of whether the loader floor is horizontal or inclined upwardly or downwardly from the horizontal. Passengers can safely proceed into and from the loader without traversing a tripping hazard because the loader undercarriage can be operated to bring the edges of the floors into coplanar alignment. However, in prior art loaders when the loader-aircraft relationship is such that the vestibule is either fixedly or rotatably disposed at a position in which the vestibule doorway does not face in the direction of loader inclination, but rather faces transversely thereto, and when the loader is inclined, the end edge of the loader floor is not parallel to the edge of the aircraft floor. The edges of the floors can be made coplanar only at one point, and a shoulder is developed between the floors at all other points across the communicating width of the doorways. The tripping hazard presented in prior art loaders by this shoulder is illustrated in FIG. 3, where vestibule floor 49' is shown inclined downwardly from the terminal building and the vestibule doorway faces in a direction which is 90° from the direction of inclination of the loader. Vestibule doorway 46' faces into aircraft 22', i.e. into the plane of the drawing, perpendicularly to the downward, left-to-right direction of inclination of the loader floor. Since vestibule floor 49' inclines, but floor 50' of aircraft 22' is level, i.e., horizontal, a shoulder 54 of varying height is established between aircraft floor 50' and vestibule floor 49'. The shoulder progressively increases in height toward the right as viewed in the drawing, and a similar shoulder which increases in height to the left is established when the loader floor is inclined upwardly from left to right instead of downwardly.

The shoulder presents a particularly offensive tripping hazard because the shoulder varies in height from one side of the doorway to the other. The maximum height of the shoulder increases as the direction in which the vestibule doorway faces recedes from the direction of inclination of the loader floor, and reaches a maximum in the position of FIG. 3 where the vestibule doorway faces in a direction normal to the direction of inclination of the floor. The tripping hazard is of maximum severity at this position. Loaders constructed in accordance with the invention are free of any such tripping hazard because the loader floor at the aircraft vestibule can be established in a horizontal position and thus level with the horizontal aircraft floor irrespective of the overall inclination of the loader.

Returning to FIG. 1, the inner end portion of main tunnel section 36 includes a pair of rearwardly projecting box beams 54, 56 (see also FIG. 4) which are rigidly secured to the bottom of tunnel segment 32. Beams 54, 56 are pivotally mounted on a bracket 58 forming part of a capped bearing tube and bracket assembly 59 which is carried by pedestal 30. Beam 54 rotatably receives a pivot pin 60 having opposite ends respectively journaled in ears 62, 64 which project upwardly from bracket 58. Beam 56 is identically mounted, and pivot pins 60, 60' are coaxially disposed so that main tunnel section 36 is mounted on pedestal 30 for vertical swinging movement about the common axis of the pivot pins.

Figure 5:
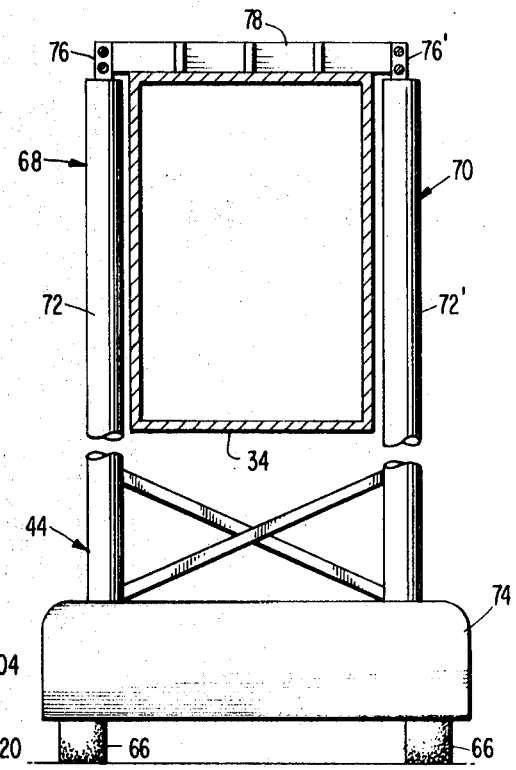
FIG. 5 is a detail view showing structure for vertically swinging the loader of FIG. 1.

Undercarriage 44 (FIG. 1) is connected to the outer end of tunnel section 36. The undercarriage can move the outer end of the loader out onto the aircraft parking apron, and can vertically swing the loader to accommodate aircraft of varying heights. Undercarriage 44 has a pair of wheels 66 (see also FIG. 5) for translational movement of the loader across the apron. The undercarriage effects vertical swinging movement of tunnel sections 36, 38 by extension and retraction of upstanding hydraulic piston-cylinder assemblies 68, 70 which are respectively disposed on opposite sides of tunnel segment 34. Assembly 68 includes a cylinder 72, which projects upwardly from carriage underframe 74, and a piston rod 76 which is axially slidably received in cylinder 72. Assembly 70 is of identical construction. The upper ends of piston rods 76, 76' are attached to a beam 78 which is secured to the top wall of tunnel segment 34. Extension and retraction of piston rods 76, 76' raises and lowers the outer end portion of loader 20 so that the tunnel sections can be selectively moved, within the limits of piston travel, to any desired position of inclination for accommodation of aircraft of varying heights. As shown in FIG. 6, undercarriage 44' can be secured to outer tunnel section 38 instead of main tunnel section 36.

Returning to FIG. 1, aircraft vestibule 40, forming a part of outer tunnel section 38, is inserted between outwardly projecting, upper and lower support plates 80, 82 (see also FIGS. 2, 6). Plates 80, 82 are secured to a tunnel segment 84, which is a part of tunnel section 38. Vestibule 40 includes a roof 86 which carries an upwardly projecting pivot pin 90. Pin 90 is rotatably received in top plate 80. Vestibule floor 49 carries a downwardly projecting pivot pin 92 which is coaxial with pivot pin 90 and is journaled in bottom plate 82. The common axis of the pivot pins defines axis 52 of rotation of vestibule 40. Rotation of vestibule 40 is effected by a drive motor 94 which is carried by tunnel segment 84. Drive motor pinion 96 meshes with a ring gear sector 98 fixedly mounted on the vestibule at floor 49. The drive motor rotates vestibule 40 about axis 52 on annular roller bearings 100, which are mounted in bottom plate 82. Rotation of vestibule 40 swings vestibule doorway 46 from side to side (FIG. 2) to service aircraft parked at any angle relative to the loader within the limits of rotative travel of the vestibule. Depending upon the location at which the pilot parks the aircraft, vestibule doorway 46 may face in the direction of inclination of main tunnel section 36, or transversely thereto. Vestibule 40 includes a hood 102 for engaging the outside wall of aircraft 22.

Figure 9:
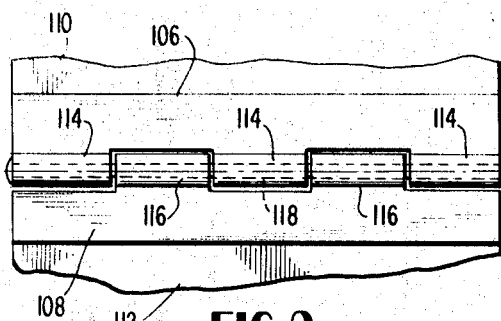
FIG. 9 is a top view of the joint structure of FIG. 7.

As indicated in FIG. 1, the inner end of outer tunnel section 38 is pivotally joined to the outer end of main tunnel section 36 in a manner which permits the outer tunnel section to move relative to the main tunnel section and swing in a vertical direction about an axis transverse to the tunnel sections. This connection is effected by a hinge member 104 (FIGS. 7, 9) which includes plates 106, 108 respectively secured to top walls 110, 112 of tunnel sections 36, 38. Plates 106, 108 respectively include intercalated journal portions 114, 116 which rotatably receive a pivot pin 118 having a horizontal central axis 120 which is the axis of pivoting of tunnel section 38. Side walls 122, 124 of tunnel sections 36, 38 recede from one another as distance downwardly from pivot connection 104 increases, to provide a wide latitude of swinging movement for tunnel section 38.

To bridge the gap formed in the floor of the loader when tunnel section 38 is swung upwardly relative to tunnel section 36 (FIG. 8) a bridge plate 126 is provided with one end joined by a pivotal connection 128 to floor 130 of outer tunnel section 38. The opposite end of bridge plate 126 is slidably carried by floor 132 of main tunnel section 36, and slides freely back and forth over floor 132 with swinging movement of outer tunnel section 38 to provide a ramp over the gap between the floors of the tunnel sections. A hood 134 carried by tunnel section 36 covers the joint between the tunnel sections, to protect passengers from adverse weather.

An extensible and retractable fluid motor 136 (FIGS. 7, 8) swings outer tunnel section 38 so that the entire outer tunnel section 38, including its floor 130 of which the vestibule floor forms a part, can be oriented in a horizontal position irrespective of the inclination of main tunnel section 36. Fluid motor 136 includes a cylinder 138 and a piston rod 140. One end of cylinder 138 is pivotally mounted on a bracket 142 secured to floor 132 of tunnel section 36. Piston rod 140 projects from the opposite end of cylinder 138 and is pivotally secured to a bracket 144 attached to floor 130 of tunnel section 38. Extension and retraction of piston rod 140 swings tunnel section 38 relative to tunnel section 36 about the axis of pivot pin 118.

Motor 136 is actuated by hydraulic fluid flowing in a circuit shown in FIG. 11. A pump 143 forces hydraulic fluid from a reservoir 144 and through a supply conduit 146 to a three-position valve 150. With valve 150 in the central position shown, fluid motor 136 is locked in position and hydraulic fluid flowing from supply conduit 146 passes directly back to reservoir 144 through a return conduit 152. Movement of valve 150 to the right from the central position communicates supply conduit 146 with conduit 154 and communicates return conduit 152 with conduit 156. Hydraulic fluid passes through conduit 154 into the right end of hydraulic cylinder 138 and retract-piston rod 140. Hydraulic fluid in the left side of cylinder 138 bleeds through conduits 156 and 152 back to reservoir 144. Shifting valve 150 to the left of center communicates supply conduit 146 with conduit 156 and communicates return conduit 152 with conduit 154. Hydraulic fluid passes from supply conduit 146 into conduit 156, extending piston rod 140, while hydraulic fluid in the right side of cylinder 138 bleeds through conduits 154 and 152 back to reservoir 144.

FIGS. 6, 10 and 11 illustrates a control system by which fluid motor 136 is automatically operated to orient outer tunnel section 38 in a horizontal position irrespective of the inclination of main tunnel section 36. The control system icludes a pendulum 158 having a shaft 160 and a weight 162 which is secured to the bottom of the shaft. A link 163 forms an articulated connection between pendulum 158 and the piston rod of a dash pot 165, which can if desired be provided to control pendulum movement and prevent abrupt swinging of the pendulum when the loader is rolled back and forth on the runway apron.

Shaft 160 is freely swingably mounted on a pivot pin 164 having opposite ends respectively journaled in one of a pair of upstanding ears 166 secured to a bracket 168. Bracket 168 is mounted on a side wall of tunnel segment 84 (FIG. 6) and is parallel to vestibule floor 49. The pivot axis of the pendulum, i.e., the axis of pivot pin 164, is parallel to the axis of the pivotal connection between tunnel sections 36, 38. Pendulum 158 is a convenient form of gravity-operated device for sensing and indicating the horizontality of outer tunnel section 38 because the pendulum swings relative to its axis to remain at a true vertical orientation irrespective of the inclination of tunnel section 38.

Secured to the underside of bracket 168 is a pair of microswitches 170, 172 having pendulum-follower arms 174, 176 respectively. The arms are positioned to respond to the position of pendulum 158 relative to its pivot axis, so that when the pendulum swings about its axis in order to remain vertically oriented notwithstanding inclination of outer tunnel section 38, the pendulum shaft 160 will be engaged by one or the other of arms 174, 176, depending upon which way the tunnel section is titled. When tunnel section 38 is inclined upwardly from left to right as viewed in FIG. 10, causing bracket 168 also to incline upwardly, pendulum 158 swings by action of gravity in a clockwise direction relative to the axis of pivot pin 164 in order to maintain a true vertical orientation. When this occurs, pendulum shaft 160 is engaged by follower arm 174, thereby closing microswitch 170 to close a circuit through a conductor 178 (FIG. 11) from an electrical source 180 to a solenoid 182. Energization of solenoid 182 moves valve 150 to the right to communicate hydraulic fluid supply conduit 146 with conduit 154 to retract piston 140, thereby lowering tunnel section 38 toward the horizontal and causing the pendulum to swing in a counterclockwise direction relative to the axis of pivot pin 164. When tunnel section 38 is horizontally oriented, bracket 168 will again be perpendicular to vertical pendulum shaft 160, and pendulum 158 is returned to its original position with respect to its pivot axis. Follower arm 174 is springbiased to follow shaft 160, so that microswitch 170 is opened when tunnel section 38 is again horizontal. Solenoid 182 is deenergized by opening of microswitch 170, and flow of hydraulic fluid to cylinder 136 is stopped by action of a tension spring 184 in moving valve 150 back to its central position.

When the outer tunnel section is inclined downwardly from left to right, causing bracket 168 likewise to be inclined downwardly, pendulum 158 swings counterclockwise relative to the axis of pivot pin 164 in order to remain at a true vertical orientation. Shaft 160 is engaged by follower arm 176, and closes microswitch 172 to close a circuit through a conductor 186 from electrical source 180 to energize a solenoid 190. Energization of solenoid 190 moves valve 150 to the left, communicating hydraulic fluid supply conduit 146 with conduit 156 to extend piston rod 140, thereby raising tunnel section 38 toward the horizontal and causing pendulum 158 to swing in a clockwise direction relative to the axis of pivot pin 164. Spring-biased arm 176 follows pendulum 158 as the pendulum approaches its original position relative to its axis. When tunnel section 38 is again horizontal, microswitch 172 is opened, breaking the circuit to solenoid 190. A tension spring 192 returns valve 150 to its central position.

It will be observed that whenever the undercarriage 44 is raised or lowered to change the inclination of the loader tunnel, pendulum 158 will swing relative to its axis to remain vertical irrespective of the angle of inclination of tunnel sections 36, 38. Whenever the vertical swinging movement of the loader causes outer tunnel section 38 to depart from a horizontal disposition, the pendulum swings relative to its axis and follower arms 174, 176 sense the position of the pendulum and respond thereto by closing the microswitches to actuate fluid motor 136 to extend or retract and thereby return tunnel section 38 to horizontal disposition. When tunnel section 38 reaches the horizontal position, it is automatically stopped and locked through action of the pendulum, the pendulum-responsive switches and valve 150, so that the leveling operation of outer tunnel section 38 is effected entirely automatically.

For manual control, push-button switches 191, 193 (FIGS. 10, 11) are mounted on bracket 168 and are connected in parallel circuit relationship with microswitches 170, 172 respectively. Closure of switch 191 or 193 actuates fluid motor 136 in the same fashion as closure of microswitches 170 or 172, respectively. A spirit level 194 is provided on bracket 168, contiguous to manual switches 191, 193 for indicating the horizontality of tunnel section 38. The operator determines the orientation of tunnel section 38 relative to the horizontal from the location of a bubble in the spirit level, and operates switch 193 or 191 to extend or retract fluid motor 136 as required to bring tunnel section 38 into horizontal disposition.

If desired, an automatic relay system operating from an electronic device sensing the position of the bubble in a spirit level can be provided instead of the pendulum to automatically control opening and closing of microswitches 170, 172.

In lieu of fluid motor 136, an electrically driven jack screw assembly 196 (FIG. 12) can be employed. Assembly 196 includes a tube 198 having one end pivotally mounted on tunnel section 36. Concentrically inside tube 198 is another tube 200 having an end projecting beyond outer tube 198 and pivotally mounted on tunnel section 38. An externally threaded shaft 202 is disposed concentrically inside tube 200, and is threadedly received in an annulus 204 fixed in the end of the tube 200. Shaft 202 extends through the end of tube 198, and is keyed to a gear 206. Gear 206 meshes with a drive pinion 208 of a reversible electric motor assembly 210 carried by tube 198. Rotation of gear 206 selectively in opposite directions respectively extends and retracts inner tube 200 relative to outer tube 198 by action of threaded shaft 202, and swings tunnel section 38 relative to tunnel section 36 in the same manner as fluid motor 136.

A summary of operation of the loader of FIG. 1 is as follows: When an aircraft is to be serviced, undercarriage 44 is operated to move the free end of loader 20 out onto the aircraft parking apron, detelescoping tunnel segments 32, 34. Hydraulic piston-cylinder assemblies 68, 70 are extended or retracted as needed to dispose vestibule 40 at the proper height for registration with the doorway of the aircraft. Vestibule 40 is rotated about vertical axis 52 to the proper disposition for the angle at which the aircraft is parked. Assuming that both tunnel sections 36, 38 were originally in horizontal disposition and the loader must be lowered to register with a low aircraft doorway, hydraulic piston-cylinder assemblies 68, 70 of undercarriage 44 are retracted, thereby inclining tunnel section 36 downwardly from the terminal. This action also tilts outer tunnel section 38 downwardly, because fluid motor 136 and pivot connection 104 lock the two tunnel sections together. When the loader is swung downwardly, thereby inclining tunnel section 38 downwardly, pendulum 158 swings on its axis to remain vertical and the inclination of tunnel section 38 causes follower arm 176 of microswitch 172 to engage pendulum 158. This operates valve 150 to extend piston rod 140, raising tunnel section 38 until it achieves a horizontal position at which point it is locked by automatic operation of pendulum 158 and valve 150. Final elevational adjustments of undercarriage 44 are effected if necessary to bring the vestibule floor into coplanar relation with the aircraft floor, and pendulum 158 automatically compensates for any misorientation of tunnel section 38 which occurs in this process, until vestibule 40 is brought into accurate registry with the aircraft.

If, instead of lowering the loader, it is necessary to raise the loader to service the aircraft, tunnel sections 36, 38 are inclined upwardly instead of downwardly by extension of the piston-cylinder assemblies of undercarriage 44. Pendulum 158, swinging relative to its axis to remain vertical, is engaged by arm 174 of microswitch 170, operating valve 150 to retract piston rod 140 and thereby lower outer tunnel section 38 into a horizontal position at which it is stopped and locked.

Figure 13:
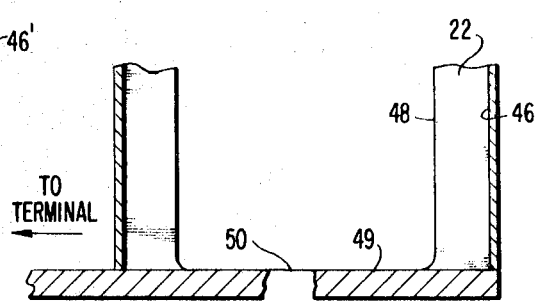
FIG. 13 schematically illustrates how the tripping hazard of FIG. 3 is eliminated in loaders made in accordance with the invention.

Whenever outer tunnel section 38 is nonhorizontal, pendulum 158 automatically actuates fluid motor 136 to bring the outer tunnel section to a horizontal orientation irrespective of the inclination of main tunnel section 36, so that floor 49 of outer tunnel section 38 is horizontal like the floor of the aircraft. As will be appreciated from FIG. 13, even when vestibule doorway 46 faces 90° from the direction of inclination of the main tunnel section, vestibule floor 49 is horizontal and can be made coplanar with level aircraft floor 50 across the width of the vestibule doorway so there is no tripping hazard presented to enplaning and deplaning passengers such as shoulder 54 in the prior art loader of FIG. 3.

Figure 14:
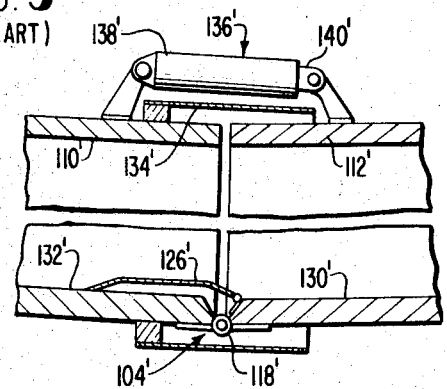
FIG. 14 depicts an alternative arrangement for the details of FIG. 7.

As shown in FIG. 14 the position of the power unit and the hinge connection can be reversed, with fluid motor 136' being mounted on the roofs of the tunnel segments and hinge member 104' being mounted on the floors.

Although the invention has been described in connection with a preferred embodiment thereof in an aircraft loader, other types of conveyances can be serviced by conveyance loaders made in accordance with the invention. This and other modifications can be made without departing from the principles of the invention as defined by the appended claims.

I claim:

1. A conveyance loader, comprising:
a base,
means defining a first passageway section,
means mounting the first passageway section for generally vertical swinging movement on the base,
means for generally vertically swinging the first passageway section selectively to a plurality of positions of inclination relative to the horizontal,
means defining a second passageway section operatively associated with the first passageway section to define a continuous passageway,
the second passageway section having a free end portion for registration with a passage in a wall of a conveyance,
the second passageway section having a floor portion,
motive means for swinging at least the floor portion of the second passageway section relative to the first passageway section and in a generally vertical direction, and
control means for operating the motive means to orient at least the floor portion of the second passageway section in a generally horizontal position irrespective of the position of inclination of the first passageway section.

2. The conveyance loader of claim 1,
the free end portion of the second passageway section including means defining a vestibule having a doorway facing in a direction transverse to the direction of inclination of the first passageway section.

3. The conveyance loader of claim 2, including
means for rotating the vestibule about a generally vertical axis to face the doorway in the direction transverse to the direction of inclination of the first passageway section.

4. The conveyance loader of claim 1,
the control means including gravity-operated means carried by the second passageway section for indicating the horizontality of at least the floor portion of the second passageway section, and
actuator means responsive to the gravity-operated means for actuating the motive means.

5. The conveyance loader of claim 4,
the gravity-operated means including a pendulum member,
the control means including means mounting the pendulum member for swinging movement relative to an axis to a plurality of horizontality-indicating position, and
the actuator means including means for sensing the position of the pendulum member.

6. A conveyance loader, comprising
a base,
means defining a first passageway section,
means mounting the first passageway section for generally vertical swinging movement on the base,
means for generally vertically swinging the first passageway section selectively to a plurality of positions of inclination relative to the horizontal,
means defining a second passageway section operatively associated with the first passageway section to define a continuous passageway,
the second passageway section having a free end portion for registration with a passage in a wall of a conveyance,
connecting means movably interconnecting the second passageway section and the first passageway section for generally vertical swinging movement of the second passageway section,
motive means for swinging the second passageway section relative to the first passageway section and in a generally vertical direction, and
control means for operating the motive means to orient the second passageway section in a generally horizontal position irrespective of the position of inclination of the first passageway section.

7. The conveyance loader of claim 6,
the free end portion of the second passageway section including means defining a vestibule having a doorway facing in a direction transverse to the direction of inclination of the first passageway section.

8. The conveyance loader of claim 7, including
means for rotating the vestibule about a generally vertical axis to face the doorway in the direction transverse to the direction of inclination of the first passageway section.

9. The conveyance loader of claim 6,
the connecting means including means pivotally joining the second passageway section to the first passageway section.

10. The conveyance loader of claim 6, wherein the motive means includes extensible and retractable power means having opposite end portions, and including
means mounting one of the end portions on one of the passageway sections, and
means mounting the other end portion on the other passageway section.

11. The conveyance loader of claim 10,
the power means including a fluid motor and means for driving the fluid motor,

12. The conveyance loader of claim 10,
the power means including a screw member and means for driving the screw member.

13. The conveyance loader of claim 10,
each passageway section including an upper portion and a lower portion,
the connecting means being disposed at the upper portions of the passageway sections, and
the power means being disposed at the lower portions of the passageway sections.

14. The conveyance loader of claim 10,
each passageway section including an upper portion and a lower portion,
the connecting means being disposed at the lower portions of the passageway sections, and
the power means being disposed at the upper portions of the passageway sections.

15. The conveyance loader of claim 6,
each passageway section including an upper portion,
the connecting means being disposed at the upper portions of the passageway sections.

16. The conveyance loader of claim 6, including
a bridge member having opposite end portions,
each passageway section including a floor portion,
means movably joining one of the end portions of the bridge member to one of the passageway sections,
the other end portion of the bridge member being movably carried by the other passageway section, and
the bridge member extending from the floor portion of the one passageway section to the floor portion of the other passageway section.

17. The conveyance loader of claim 6,
the control means including gravity-operated means carried by the second passageway section for indicating the horizontality of the second passageway section, and
actuator means responsive to the gravity-operated means for actuating the motive means.

18. The conveyance loader of claim 17,
the gravity-operated means including a pendulum member,
the control means including means mounting the pendulum member for swinging movement relative to an axis to a plurality of horizontality-indicating positions, and
the actuator means including means for sensing the position of the pendulum member.

19. The conveyance loader of claim 18,
the connecting means including means pivotally joining the second passageway section to the first passageway section for movement of the second passageway section about a generally horizontal axis which is generally parallel to the axis of the pendulum member.

20. The conveyance loader of claim 6,
the control means including manually operative means for actuating the motive means, and
means contiguous to the manually operative means for indicating the horizontality of the second passageway section.

References Cited

UNITED STATES PATENTS

| | | | |
|---|---|---|---|
| 3,099,847 | 8/1963 | Lodjic | 14—71 |
| 3,121,243 | 2/1964 | Phillips | 14—71 |
| 3,310,823 | 3/1967 | Preiss | 14—71 |

FOREIGN PATENTS

| | | | |
|---|---|---|---|
| 1,445,195 | 5/1966 | France | 14—71 |

JACOB L. NACKENOFF, Primary Examiner